United States Patent
Niemi et al.

(10) Patent No.: US 6,584,491 B1
(45) Date of Patent: Jun. 24, 2003

(54) ARRANGEMENT FOR MONITORING A PROGRESS OF A MESSAGE FLOWING THROUGH A DISTRIBUTED MULTIPROCESS SYSTEM

(75) Inventors: Frederick E. Niemi, Cary, NC (US); Kenneth W. Chambers, Raleigh, NC (US); Thomas B. George, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/339,825

(22) Filed: Jun. 25, 1999

(51) Int. Cl.[7] .......... G06F 15/16; G06F 17/40; G06F 11/36
(52) U.S. Cl. .......... 709/202; 709/224; 709/318; 714/39; 714/45; 717/128
(58) Field of Search .......... 709/201, 202, 709/224, 318; 717/124, 128; 714/38, 39, 45

(56) References Cited

U.S. PATENT DOCUMENTS

| | | | | |
|---|---|---|---|---|
| 6,083,281 A | * | 7/2000 | Diec et al. .......... | 717/128 |
| 6,105,059 A | * | 8/2000 | Al-Karmi et al. .......... | 709/219 |
| 6,144,967 A | * | 11/2000 | Nock .......... | 707/103 R |
| 6,470,388 B1 | * | 10/2002 | Niemi et al. .......... | 709/224 |

OTHER PUBLICATIONS

IBM TDB NN941219 "Events set for event tracing in Distributed Objected–Oriented systems", v.37 n.12, Dec. 1994.*

* cited by examiner

Primary Examiner—Dung C. Dinh
(74) Attorney, Agent, or Firm—Leon R. Turkevich

(57) ABSTRACT

An arrangement in a distributed multi-process system enables centralized monitoring of selected messages that pass through the distributed multi-process system, regardless of the message path or the results of the operations performed on the message by any of the associated processes. An event source process, configured for generating a message corresponding to an occurrence of an event, selectively sets a tracing bit in the message and outputs the message for reception by a destination consumer process. The source process also outputs a first trace message specifying that the source process has output the message. The system also includes an event distribution system having a plurality of distributed filter processes, each configured for selectively passing the message based on a corresponding filter condition. Each filter process also generates a corresponding tracing message indicating the operation performed on the message, in response detecting that the tracing bit is set. The tracing messages are sent to a centralized logging process, configured for collecting the trace messages for monitoring of the progress of the message. Hence, the path of the message throughout the multiple processes in the distributed multi-process system can be readily determined by a consumer process accessing the centralized logging process.

26 Claims, 3 Drawing Sheets

ARRANGEMENT FOR MONITORING A PROGRESS OF A MESSAGE FLOWING THROUGH A DISTRIBUTED MULTIPROCESS SYSTEM

BACKGROUND OF THE INVENTION

1. Field of the Invention

The present invention relates to distributed message passing systems in client-server networks implemented across a local area network or a wide area network.

2. Description of the Related Art

One of the uses for network management applications is to asynchronously monitor the performance of network operations, including support of client-server applications across a local area network or a wide area network. The network management applications provide information related to network performance by sending notifications or messages in response to detecting prescribed events that may affect a network resource. For example, a network management application monitoring a router performance may monitor the CPU utilization in a router; if the CPU utilization reaches a certain threshold, for example, 80%, the network management application may send a message to a monitoring application to notify that the router CPU is busy, indicating a potential problem. Hence, network management applications are important in maintaining network stability and robustness.

Client-server computing is becoming more advanced and sophisticated, with improved hardware infrastructure, high-speed, low-cost, wide-area bandwidth and distribution of computer applications across multiple computers connected by local area and wide area networks. These advanced networks use distributed objects for processing of distributed transactions across the wide-area network. An exemplary implementation of a distributed object architecture is the Common Object Request Broker Architecture (CORBA) 2.0 specification adapted in December 1994 by the Object Management Group (OMG). The CORBA specification creates interface specifications, written in a neutral Interface Definition Language (IDL), that defines a component's boundaries and enables objects to interoperate in heterogeneous client-server environments.

However, as systems become more complex, it becomes increasingly difficult to recognize and trace the progress of specific events, messages, and the like, as they flow through a system. For example, assume that a developer of a network application wishes to monitor the occurrence of events detected at a source application, also referred to a source process. The source process registers with an event distribution system that distributes messages received from the source process, including messages indicating the occurrence of the event. Consumer applications, also referred to as consumer processes, that are interested in obtaining information about a certain event register their interest with the event distribution system by specifying a prescribed filtered condition. Hence, the event distribution system, upon receiving a message from a source process, executes the filter process to determine whether the consumer process should receive the message corresponding to the occurrence of the event from the source process. The event distribution system selectively passes the message to the registered consumer process based on the message satisfying the prescribed filtered condition. Alternatively, the consumer process may periodically poll the event distribution system for events.

However, the monitoring for messages may be substantially complex if the event distribution system may divided into a cascaded group of multiple processes, where the message corresponding to an occurrence of an event passes through multiple filters as the message flows through the system. In particular, at any one point, the message may not be passed by the filter, but instead may be dropped or rejected by the filter. If the message is dropped due to an error in the filter, then substantial debugging efforts may be necessary in order to correct the faulty filter.

Prior attempts at tracing a progress of a message path have had limited effectiveness. For example, a trace route type function might be used to determine the path, or flow from process to process. However, multiple messages may be flowing from hundreds or thousands of different source processes throughout the system, creating a time consuming problem in attempting to identify a specific message or a specific filter. Hence, use of a trace route type function to determine the path or flow from process of a generic message may result in a tedious and laborious debugging process.

An alternative approach involves setting a specific trace debug option on each process and examining the trace output to determine how incoming messages are processed. For example, certain systems trace each and every event processed by each and every process within a distributed system. In this case, each process has its own associated log for storing the result of operation by the corresponding process on the message. In this case, however, a programmer would need to combine all the logs of the different processes within the distributed system and correlate the logs together to attempt to identify what process handled what message, and at what step in the message flow. Hence, substantial efforts would be necessary to identify the processes operating on a given message, locate the log entry for that message in the corresponding log, compile all the log entries from the different processes, and determine the appropriate order of the log entries relative to the path of the message.

SUMMARY OF THE INVENTION

There is a need for an arrangement that enables efficient tracing and monitoring of the progress of an event message as the message passes through a distributed multiple process event distribution system.

There is also a need for an arrangement that enables centralized monitoring of selected messages as they pass through a distributed multi-process system, regardless of the message path or the results of the operations performed on the message by any of the associated processes.

These and other needs are attained by the present invention, where a source process sets a tracing bit in a message that is to be traced as it passes throughout a distributed multi-process system. Hence, each process receiving the message determines whether the received message has the tracing bit set, and in response outputs a trace message, enabling the message to be traced throughout the system. A centralized logging process may be used for collecting the trace messages for the monitoring of the progress of the message throughout the different processes.

According to one aspect of the present invention, a system is provided for monitoring a progress of an event. The system includes a source process configured for generating a message corresponding to an occurrence of an event, the source process selectively setting a tracing bit in the message and outputting the message for reception by a destination consumer process. The source process also outputs a trace message specifying the outputting of the message by the source process. The system also includes an event distribution system having a distributed plurality of filter processes configured for selectively passing the message for reception by the destination consumer process based on respective prescribed filter conditions. Each of the filter processes having received the message outputs a corresponding trace message in response to detection of the tracing bit, indicating whether the message was passed by the corresponding filter process for monitoring the progress of the message. Setting of the tracing bit by the source process enables the filter process and any subsequent processes to identify the need to generate trace messages specifying the operation performed by the corresponding process. Hence, the path of the message throughout the multiple processes in the distributed multi-process system can be readily determined by a consumer process.

Another aspect of the present invention provides an event distribution system. The event distribution system includes a source process interface for receiving a message corresponding to an occurrence of an event from a source process, and a distributed plurality of filter processes configured for selectively passing the message for reception by a destination consumer process based on respective prescribed filter conditions. Each filter process having received the message outputs a corresponding trace message specifying whether the message is passed, in response to detecting a tracing bit set in the message, for tracing a progress of the message throughout the event distribution system.

Still another aspect of the present invention provides a method of tracing a progress of a message between a source process and a destination consumer process. The method includes receiving a message from the source process corresponding to an occurrence of an event in the source process, and selectively passing the message by a distributed plurality of filter processes based on respective prescribed filter conditions, for reception by the destination consumer process in each of the filter processes having received the message. The method also includes, in each of the filter processes having received the message, outputting a trace message specifying whether the message is passed based on the corresponding prescribed filter condition, in response to detecting a tracing bit set in the message.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, where elements having the same reference numeral designations represent like elements throughout and wherein.

BEST MODE FOR CARRYING OUT THE INVENTION

Figure 1:
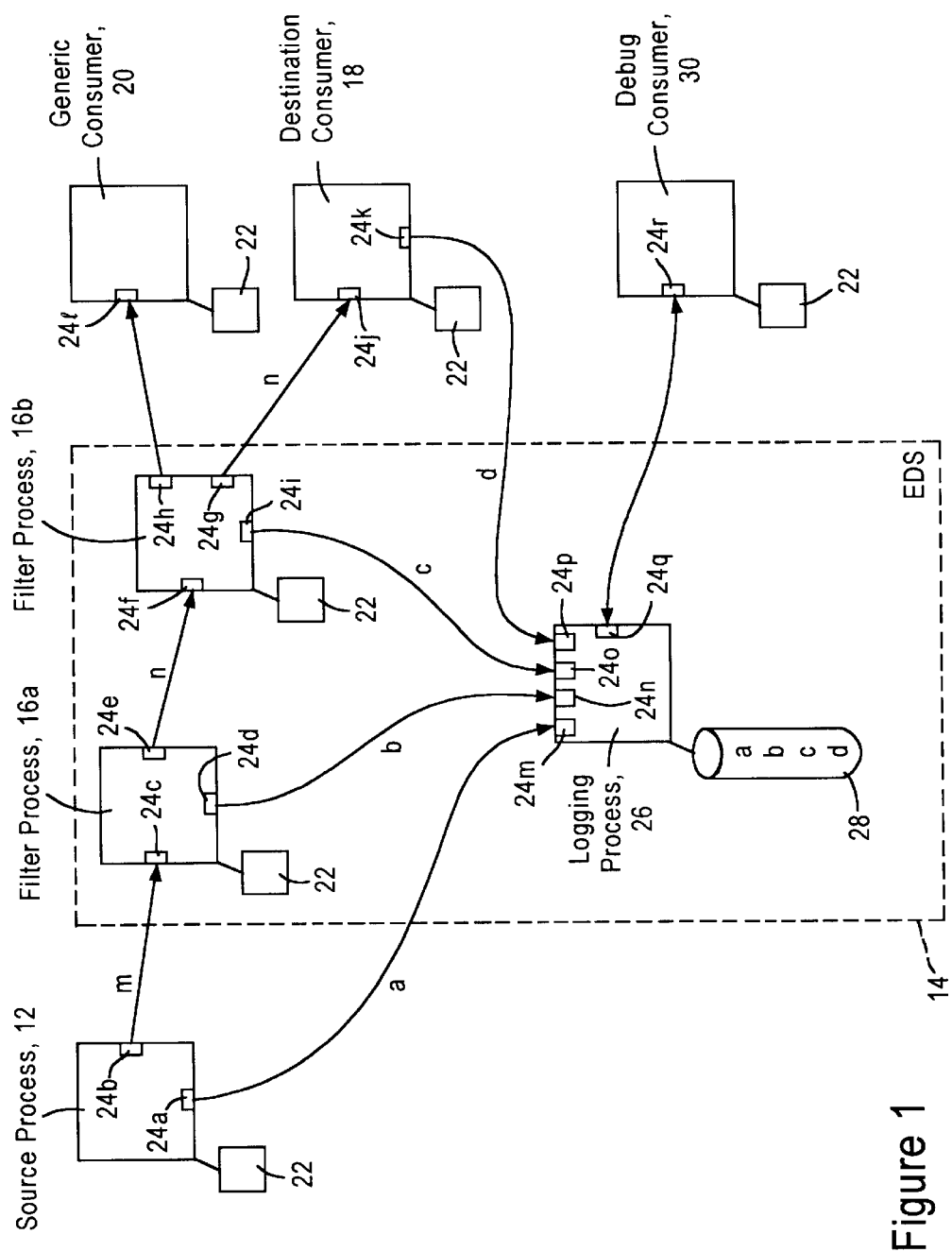
FIG. 1 is a block diagram illustrating a distributed multi-process system configured for monitoring a progress of an event according to an embodiment of the present invention.

FIG. 1 is a block diagram illustrating a system for monitoring a progress of an event according to an embodiment of the present invention. The system 10 includes a source process 12 configured for generating a message (m) that corresponds to an occurrence of an event detected by the source process 12. The system also includes an event distribution system (EDS) 14 that includes a distributed plurality of filter processes 16 configured for receiving the message (m) and selectively passing the message for reception by a destination consumer process 18. Each filter process 16 has a corresponding filter condition for determining whether the message (m) should be passed or rejected. As shown in FIG. 1, if all the distributed filter processes 16 pass the message m, the destination consumer 18 receives the message (m) from the last process in the message path.

The system 10 is preferably implemented using CORBA specifications for communication between the multiple processes. CORBA is an industry standard by the Object Management Group for defining client-server communications. In particular, each process has access to a library of executable routines, enabling each process to initiate a method call (for example, a function call to a dynamically linked library). Note that each process is typically executed on a single computer or workstation, although multiple instances of the same process may be executable on different networked computers.

The function calls between processes are supported by CORBA distributed objects, i.e., units of executable routines that can exist anywhere on a network. The CORBA objects are binary components that remote clients can access via method invocations where the language and compiler used to create server objects are transparent to clients. Rather, the client process relies on the interface specification published by the server object to determine the operation of the CORBA object. Additional details regarding the execution and implementation of inter-process communications using CORBA is disclosed in Orfali et al., "The Essential Distributed Objects Survival Guide, published 1996 by John Wiley & Sons, Inc. (ISBN 0-471-12993-3), the disclosure of which is incorporated in its entirety by reference.

As described above, a problem exists in prior network management applications, where each process having its own local logging system 22 could store the results of each operation performed by the process, requiring a programmer to possibly review millions of log entries to determine whether the message m was passed or rejected by the corresponding filter 16 at a given point in time. In addition, the programmer would need to access all the logs 22 of the associated processes in an attempt to recover the relevant information to reconstruct the path of the message (m) throughout the system 10.

According to the disclosed embodiment, a centralized logging process 26 collects trace messages from different processes for centralized storage of trace messages generated in response to processing of a specific message. In particular, the source process 12 selectively sets a tracing bit in the message (m) and outputs the message (m) for reception by a destination consumer process 18. A generic consumer 20 may also poll a selected process 16b to determine the presence of the message (m). The source process 12 outputs a first trace message (a) that specifies that the source process 12 has output the message (m). Hence, the trace message (a) serves as a separate object that is used in recording the occurrence of transmission of the message by the source process 12 in the logging process 26. As described in detail below with respect to FIG. 2, the source process 12 outputs the trace message (a) to the logging process 26 by generating a function call to a dynamically linked library (DLL) executable within the logging process 26 and accessible via a CORBA interface 24a and 24m. The centralized logging process 26 stores the trace message in a log 28. The source process 12 also initiates a CORBA call for transfer of the message (m) to the EDS 14 for processing by the filter process 16a via CORBA interfaces 24b and 24c.

The filter process 16a, in response to determining that the tracing bit is set in the received message (m), selectively passes the message via the CORBA interface 24e and outputs a second trace message (b) specifying whether the message is passed to the logging process 26 via CORBA interfaces 24d and 24n for storage in the log 28. The filter process 16a may output the message (m) to any consumer registered with the filter 16a, for example a destination consumer, a generic consumer, or another filter 16. As shown in FIG. 1, the message (m) may be passed between a distributed plurality of filter processes 16a, 16b configured for selectively passing the message for reception based on respective prescribed filter conditions. Hence, each filter process 16 outputs the corresponding tracing message to the centralized logging process 26, such that the filter process 16b outputs its own tracing message (c) to the centralized logging process 26 that specifies whether the message was passed by the corresponding filter process 16b, in response to detecting the tracing bit in the message (m).

The destination consumer, upon receiving the message (m), sends its own tracing message (d) to the centralized logging process 26, enabling a separate consumer process 30 (for example, a network administrator or programmer) to conveniently trace the path of the message (m) based on the stored tracing messages a, b, c and d stored in the log 28.

Figure 2:
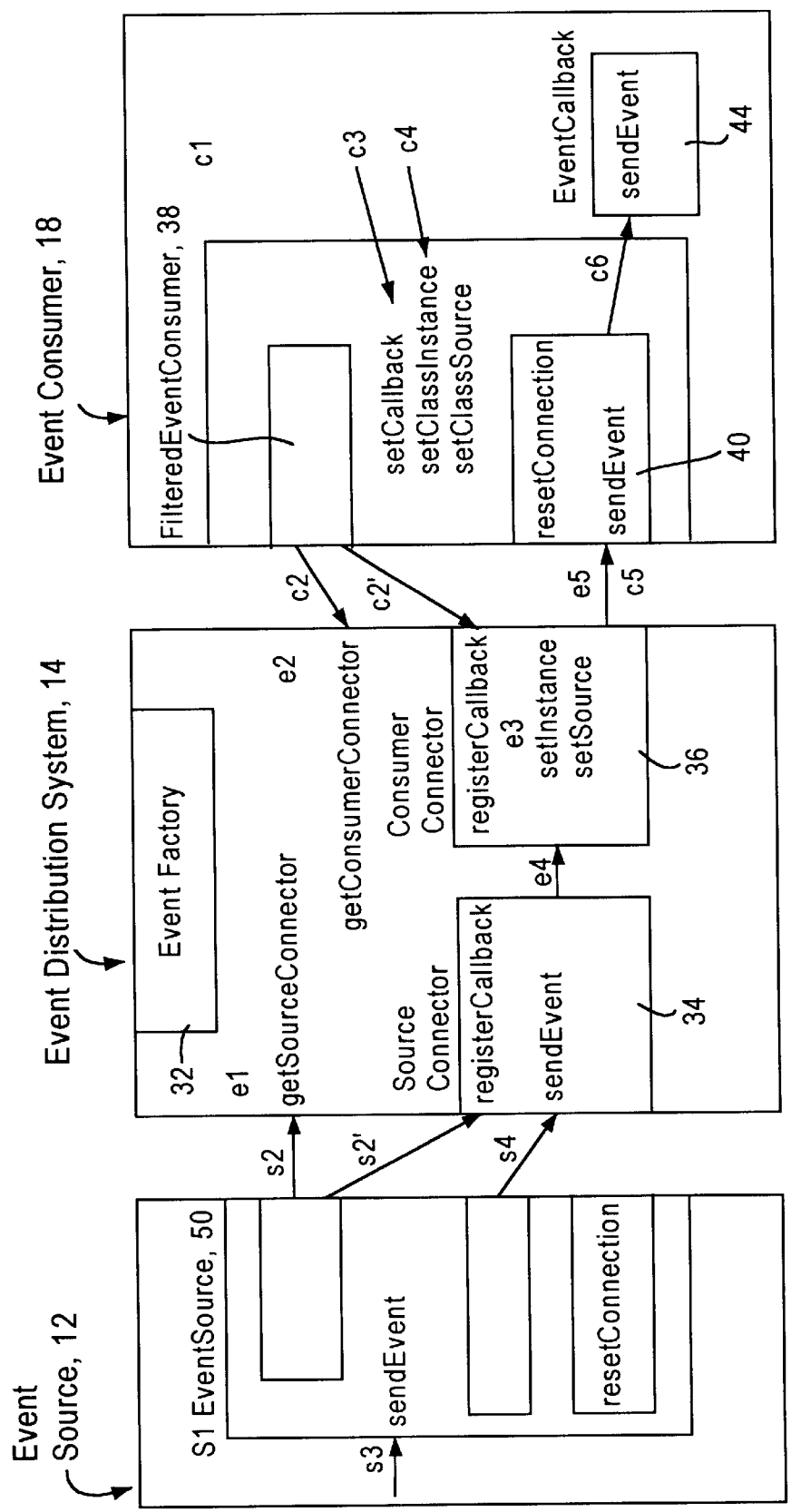
FIG. 2 is a block diagram illustrating in detail the interface definitions between the event source, the event distribution system and one of the event consumers of FIG. 1.
Figure 3:
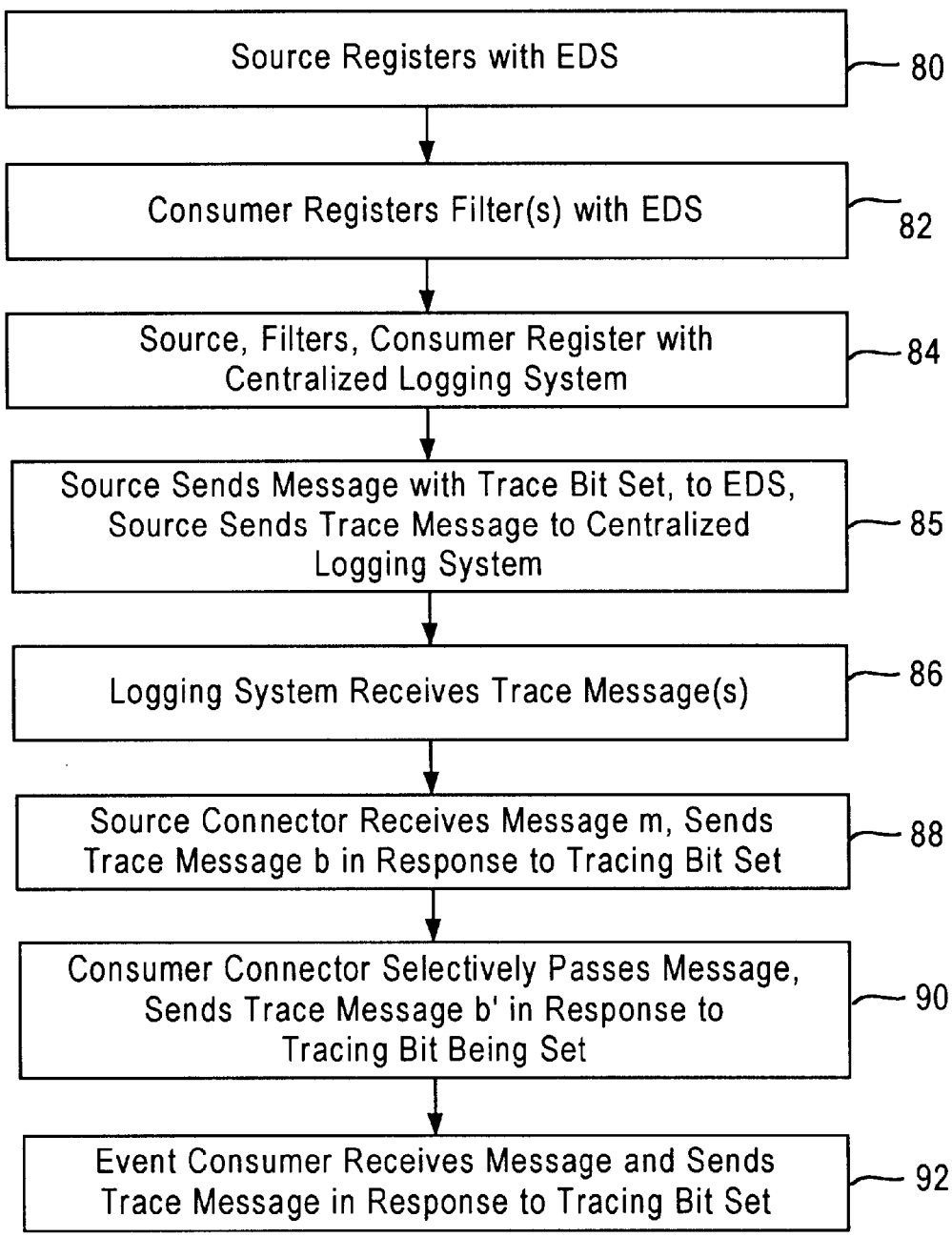
FIG. 3 is a flow diagram illustrating the method for monitoring the progress of an event according to an embodiment of the present invention.

FIGS. 2 and 3 describe in further detail the arrangement for monitoring a progress of an event in a distributed multiprocess system. In particular, FIG. 2 illustrates in detail exemplary interfaces, illustrated using reference numeral 24 in FIG. 1, that are established between a source process 12, an event consumer 18, and a filter 16 of the event distribution system 14. It should be recognized, that the description with respect to FIG. 2 is applicable toward all inter-process communications, including the distributed processes 16a, 16b, 26 within the EDS 14, as well as all the consumer processes 18, 20, and 30.

As shown in FIGS. 2 and 3, the source process 12 first registers with the event distribution system 14 in step 80 by initiating an executable Java class 37 EventSource" 50 (step s1), where the Java class "EventSource" 50 is defined according to a prescribed CORBA specification. The Java class "EventSource" 50 requests a source connector interface 24 as a client request by issuing a function call (step s2) entitled "getSourceconnector" to the process 16. More specifically, the "EventSource" Java class 50 issues a bind (i.e., a link of the software interface between two objects) to an Event Factory process 32, where the bind identifies the executable object "getSourceConnector." The event factory 32 responds as a server to the client (i.e., the bind) request by creating an instance 34 of the Source Connector service. The Source Connector service instance 34 may be executable within the same process as the event filter server 16, or within a different process. Hence, the processes within the filter 16 may be distributed amongst a plurality of different servers. The Source Connector service instance 34 is provided a unique identifier by the event factory 32 supplied by the EventSource class 50. A source callback interface is created in the EventSource Java class 50 and the EventSource Java class 50 registers with the Source Connector interface 34 by issuing a function call to the registerCallback method (step s2'). The EventSource Java class (50) then reads and saves the source identifier from the Source Connector service instance 34.

The consumer process 18 also registers the filter to be used in step 82, for example by instantiating the FilteredEventConsumer Java class 38 (step c1). The FilteredEventConsumer Java class 38 issues a bind to the event factory 32 identifying the executable object "getConsumerConnector" (step c2). The event factory responds to the issued bind in step c2 by creating an instance 36 of the Consumer Connector service with a unique identifier supplied by the FilteredEventConsumer class 38. A consumer callback interface 40 is created by the FilteredEventConsumer class 38 (step c3) and registered with the Consumer Connector interface 36 by issuing a function call to the registerCallback method (step e3). These connections between interfaces 36, 38 and 40 remain up until the Consumer Connection interface calls the resetConnection method in the consumer callback interface 40 or there is an error in trying to receive events from the event server (i.e., the process 16 of FIG. 2).

The event consumer 18 then registers one or more filters with the EDS 14. In particular, the event consumer 18 generates an instance of a class that implements the event filter interface by issuing the setClassInstance method call of the FilteredEventConsumer Java class 38; the class instance gets passed to the Consumer Connector service 36 via a setInstance method call by the Event Consumer 18. Alternatively, the FilteredEventConsumer class 38 issues a setClassSource method call to provide the name and source of a class that implements the event filter interface; the class source gets passed to the ConsumerConnector service 36 via a setSource method call by the Event Consumer 18. In either case, the filter process 16 obtains the Java boolean filter from the event consumer 18 in step e3 during registration of the callback.

Once the connections and callback interfaces have been established between the event source 12 and the filter 16, as well as between the filter 16 and the event consumer 18, each of the processes 12, 16 and 18 also register with the centralized logging system 26, in step 84, in the same manner of issuing function calls and callback routines according to the client-server model described above.

The actual monitoring of a progress of event begins in step 85, where the source process 12 generates a message (m) by executing a sendEvent command (step s3). The event source 12 also outputs a trace message (a) in step 85 that specifies the message (m) was output from the event source 12. Specifically, the trace message (a) specifies a unique identifier of message (m), the process (e.g., source process 12) generating the trace message and the operation performed by that process (e.g., generate the message in response to occurrence of a specified event); the process trace message may also specify a destination process (e.g., filter process 16a) if the message is output by the process. When the logging process 26 receives a trace message in step 86, the logging process 26 calls its method call of the event to get an instance of the persistent class.

After the event source 12 sends the message to the event distribution system 14 in step s4, the Source Connector instance 34 forwards the message (m) to the Consumer Connector process 36, and sends a trace message (b) to the logging process 26 indicating receipt of the message (m). (Step 88) The Consumer Connector process 36, in response to determining that the message (m) satisfies a prescribed filter condition, passes the message in step e5 to the callback process 40 and sends a second trace message (b') to the logging process 26 indicating that the message (m) was passed through the filter 16 to the event consumer. (Step 90).

The event consumer, shown as either filter 16b or as event consumer 18 in FIG. 2, receives the message (m) in step c5, and passes the message (m) to the EventCallback process 44 in step 92. The event consumer also sends a trace message (e.g., trace message (c)) to the logging process 26, indicating receipt of the message.

As described above, FIG. 2 illustrates the relationships in establishing connections and passing information by invoking prescribed routines within different processes. Hence, the client-server model of FIG. 2 may be used successively in distributed applications, such that the event consumer of FIG. 2 may actually correspond to another filter such as 16b. Hence, the message (m) may be passed to a successive plurality of processes, each configured for selectively passing the message to a subsequent process based on a prescribed filter condition. In each process, however, a trace message is sent to the logging process 26, enabling a debug consumer 30 to determine the progress of the message (m) based on generating a correlation request to the logging process 26.

According to the disclosed embodiment, a tracing bit set in the message produced by the event source enables each process that receives the message to generate a trace message that specifically states how the message was processed, and output the trace message for storage in a centralized logging process. Hence, a debug consumer 30, for example an administrator or programmer, can access the logging process 26 to learn and understand how a message is processed as it flows through a distributed multi-process system. The message that corresponds to the event is marked at a single place, namely the event producer rather than by all the processes that would actually see the message/event. Hence, the real message/event is traced, rather than tracing of any generic message that would otherwise overwhelm a network management system. Moreover, only the specific message of interest needs to be traced rather than all messages received by a process. Hence, the progress of a message in a distributed multi-process system can be readily obtained by recovering the relevant traced messages from the centralized logging process.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A system for monitoring a progress of an event, the system comprising:
   a source process configured for generating a message corresponding to an occurrence of an event, the source process selectively setting a tracing bit in the message and outputting the message for reception by a destination consumer process, the source process outputting a first trace message specifying the outputting of the message by the source process; and
   an event distribution system including a distributed plurality of filter processes configured for selectively passing the message for reception by the destination consumer process based on respective prescribed filter conditions, each of the filter processes having received the message outputting a corresponding trace message in response to detection of the tracing bit, indicating whether the message was passed by the corresponding filter process, for monitoring the progress of the message.

2. The system of claim 1, wherein each filter process, in response to receiving the message and detecting the corresponding tracing bit, outputs another trace message specifying reception of the message by the corresponding filter process.

3. The system of claim 2, wherein each filter process, in response to passing the message for reception by the destination process and detecting the corresponding tracing bit, outputs the trace message having an indication that the message satisfied the prescribed filter condition.

4. The system of claim 2, wherein each filter process, in response to not passing the message and detecting the corresponding tracing bit, outputs the trace message having an indication that the message did not satisfy the prescribed filter condition.

5. The system of claim 1, wherein the event distribution system further includes a centralized logging process for collecting the trace messages from the filter processes having received the message.

6. The system of claim 5, wherein each distributed filter process includes a connector interface configured for storing a registration for a corresponding destination process, the registration identifying that the corresponding destination process is to receive the message in response to passing said each distributed filter process.

7. The system of claim 5, wherein the centralized logging process includes a report interface for retrieving the first and second trace messages corresponding to the message.

8. The system of claim 5, wherein the logging system includes a compiler configured for correlating the first and second trace messages relative to the corresponding message in response to a correlation request from a consumer.

9. The system of claim 1, wherein the event distribution system is a Common Object Request Broker Architecture (CORBA) based process, the event distribution system including a source connector interface that defines a connection for the source process to output the message, according to Interface Definition Language (IDL).

10. The system of claim 9, wherein the event distribution system further includes a destination consumer connector interface that defines a connection for the destination consumer process, according to IDL, for requesting receipt of the message in response to the occurrence of the event.

11. The system of claim 10, wherein the event distribution system further includes a CORBA event service for supplying the message between the source process and the destination consumer process via the source connector interface and the destination consumer connector interface.

12. An event distribution system comprising:
    a source process interface for receiving a message corresponding to an occurrence of an event from a source process, and
    a distributed plurality of filter processes configured for selectively passing the message for reception by a destination consumer process based on respective prescribed filter conditions, each filter process having received the message outputting a corresponding trace message specifying whether the message is passed, in response to detecting a tracing bit set in the message, for tracing a progress of the message throughout the event distribution system.

13. The event distribution system of claim 12, further including a centralized logging process for collecting each trace message from said each corresponding filter process having received the message, and a trace message from the source process, for monitoring of a progress of the message between the source process and the destination consumer process by a consumer accessing the centralized logging process.

14. The event distribution system of claim 12, wherein each distributed filter process includes a connector interface configured for storing a registration for a corresponding destination process, the registration identifying that the corresponding destination process is to receive the message in response to passing said each distributed filter process.

15. A method of tracing a progress of a message between a source process and a destination consumer process, the method comprising the steps of:

receiving a message from the source process corresponding to an occurrence of an event in the source process;

selectively passing the message by a distributed plurality of filter processes based on respective prescribed filter conditions, for reception by the destination consumer process; and in each of the filter processes having received the message, outputting a trace message specifying whether the message is passed based on the corresponding prescribed filter condition, in response to detecting a tracing bit set in the message.

16. The method of claim 15, further comprising collecting a plurality of said trace messages, identifying respective operations relative to the message, from processes having processed the message.

17. The method of claim 16, wherein the collecting step includes receiving a second trace message from the source process indicating generation of the message.

18. The method of claim 17, wherein the collecting step further includes receiving a third trace message from the destination consumer process indicating receipt of the message.

19. The method of claim 15, further comprising registering the destination consumer process for reception of the message based on the prescribed filter condition.

20. The method of claim 15, further comprising registering a consumer process for tracing the progress of the message based on the trace messages collected for the message.

21. A computer readable medium having stored thereon sequences of instructions for tracing a progress of a message between a source process and a destination consumer process, the sequences of instructions including instructions for performing the steps of:

receiving a message from the source process corresponding to an occurrence of an event in the source progress;

selectively passing the message by a distributed of filter processes based on respective prescribed filter conditions, for reception by the destination consumer process; and in each of the filter processes having received the message, outputting a trace message specifying whether the message is passed based on the corresponding prescribed filter condition, in response to detecting a tracing bit set in the message.

22. The computer readable medium of claim 21, further comprising instructions for performing the step of collecting a plurality of said trace messages, identifying respective operations relative to the message, from processes having processed the message.

23. The computer readable medium of claim 22, wherein the collecting step includes receiving a second trace message from the source process indicating generation of the message.

24. The computer readable medium of claim 23, wherein the collecting step further includes receiving a third trace message from the destination consumer process indicating receipt of the message.

25. The computer readable medium of claim 21, further comprising instructions for performing the step of registering the destination consumer process for reception of the message based on the prescribed filter condition.

26. The computer readable medium of claim 21, further comprising instructions for performing the step of registering a consumer process for tracing the progress of the message based on the trace messages collected for the message.

* * * * *